Patented Nov. 10, 1942

2,301,664

UNITED STATES PATENT OFFICE 2,301,664

PROCESS OF SPLICING THE ENDS OF FILMS

John Eggert, Leipzig, and Hans Friedrich Nissen, Dessau, Germany; vested in the Alien Property Custodian No Drawing. Application January 22, 1938, Serial No. 186,300. In Germany February 12, 1937

4 Claims. (Cl. 154—42)

This invention relates to an improved process of splicing the ends of films.

One of its objects is to provide a process of splicing the ends of films containing a material capable of being softened by a solvent and melting upon the application of heat.

Another object of this invention is the provision of a process of splicing polyvinyl chloride films. Further objects will be apparent from the following detailed description.

In splicing films end to end or in splicing together the ends of the same film, as in the production of ring films for mechanical sound records, great difficulty is experienced in obtaining a splice which does not cause shock in use. Thus the splice should have the same strength as the film and there should be no appreciable thickening of the film at the splice.

By this invention a splice of this kind is obtained as follows. The film is so cut that the ends may overlap each other by ½ to 2 millimeters. Before placing the ends together, a solvent is smeared very thinly on the faces which are to be in contact. After placing the ends together the splice is heated so strongly that the material softened by the solvent melts. If the splice is now strongly pressed, the ends firmly adhere to one another, and the superfluous material flows laterally.

The splice may be heated and pressed by laying it between thin glass plates and pressing the plates together at the splice by heated pieces of metal. The film may be held by suitable apparatus in such a manner that the perforations are in exact registration. It is essential that the films are heated only at the places where the material is to be so far softened that it will flow, that is only at the splice, if other parts are also heated, they may become warped and uneven. The quantity of solvent, for instance acetone or chlorinated hydrocarbons used must be relatively small in order that the splice may not be softer than the rest of the film, since otherwise it is easily bent and damaged. It is true that the solvent may evaporate in time, but this would necessitate too much time, and it is preferable that the film should have its full strength as soon as it is removed from between the cooled glass plates.

Tensile tests of, for example, a polyvinyl chloride film or a cellulose acetate film spliced by this invention show that the film never tears at the splice. The tensile strength and extension of the film differ in no way from those of a film having no splice.

The invention is of special advantage in splicing two ends of a film for mechanical sound records, since in these films an irregularity in the film may cause considerable damage in respect of the guiding of the needle both in recording and in reproduction.

What we claim is:

1. A process of splicing the ends of films containing a support of uniform thickness throughout consisting of a material capable of being softened by a solvent and melting under heat, which consists in smearing said solvent on one face of each of said ends of the film to be spliced, putting said faces together by overlapping said ends, heating the splice thus made so strongly that said material softened by said solvent melts, and pressing said splice so intensely that the superfluous material flows laterally.

2. A process of splicing the ends of films containing a support of uniform thickness throughout consisting of polyvinyl chloride, which consists in smearing acetone on one face of each of said ends of the film to be spliced, putting said faces together by overlapping said ends, heating the splice thus made so strongly that the polyvinyl chloride softened by the acetone melts, and pressing said splice so intensely that the superfluous material flows laterally.

3. The process as defined in claim 1 wherein the solvent is a chlorinated hydrocarbon.

4. The process as defined in claim 1 wherein said material of which the film is composed of cellulose acetate.

JOHN EGGERT.
HANS FRIEDRICH NISSEN.